March 21, 1967         F. TROMBE         3,310,102
DEVICES FOR LOWERING THE TEMPERATURE OF
A BODY BY HEAT RADIATION THEREFROM
Filed Oct. 14, 1965         9 Sheets-Sheet 8
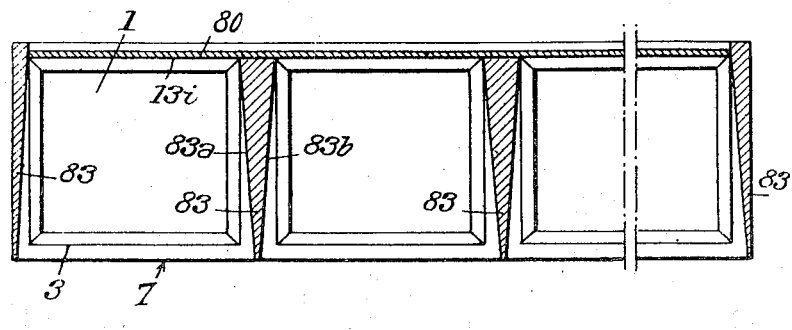
Fig.15.
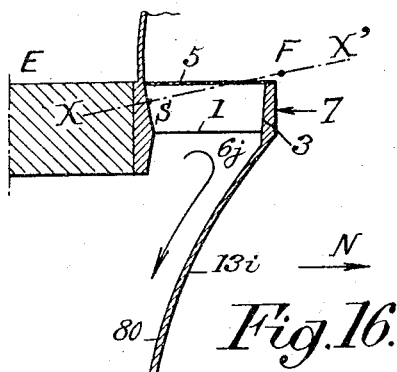
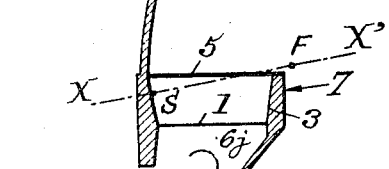
Fig.16.
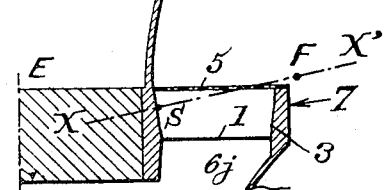
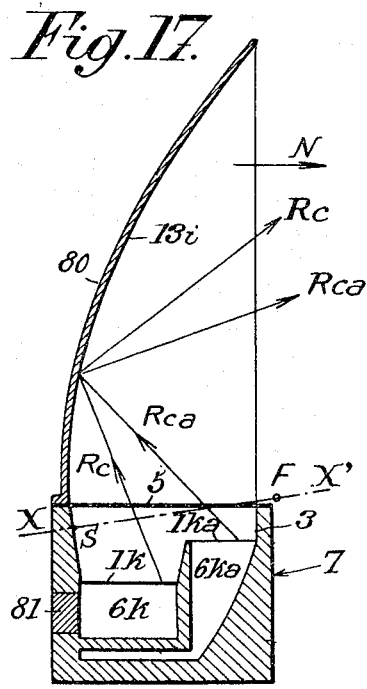
Fig.17.

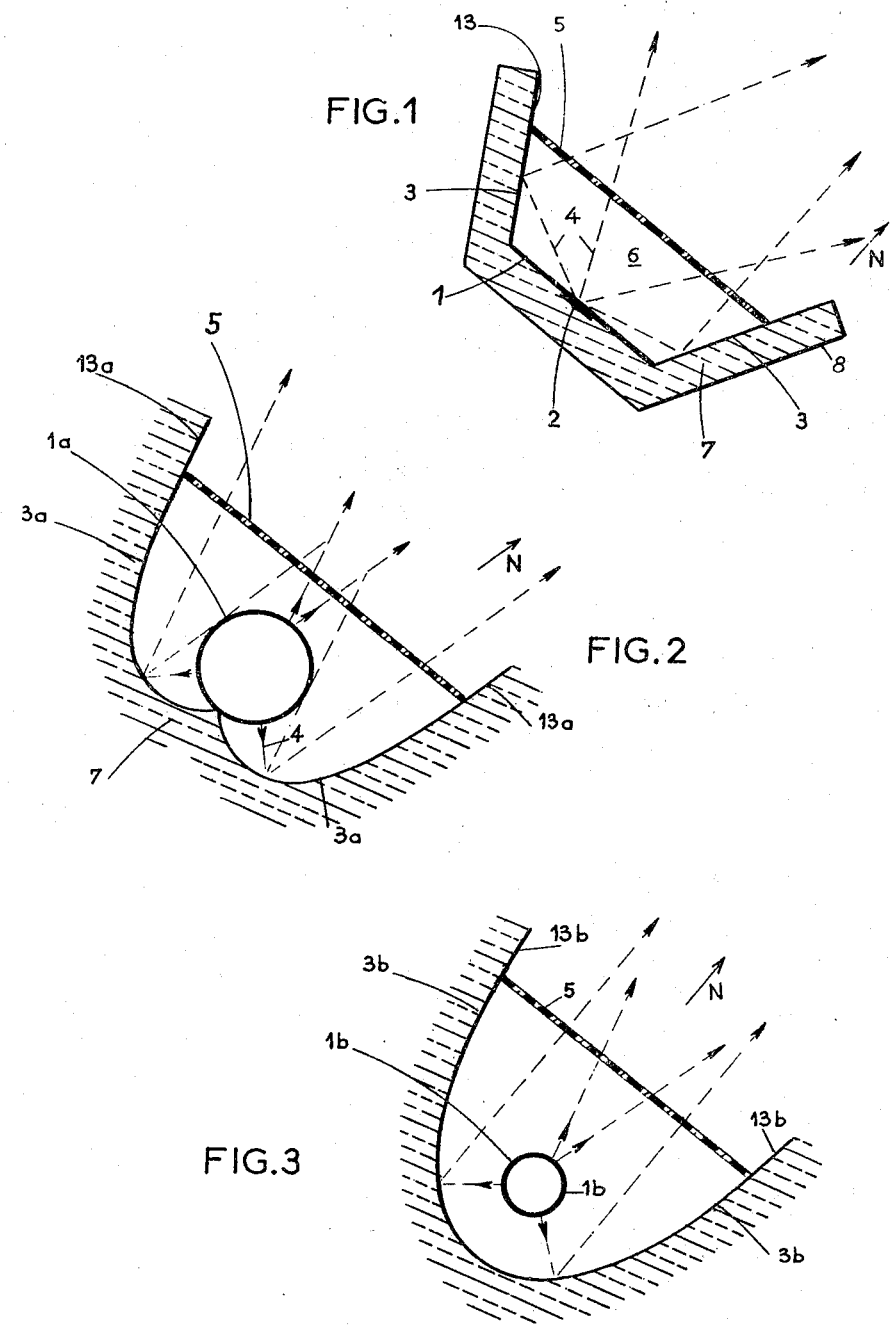

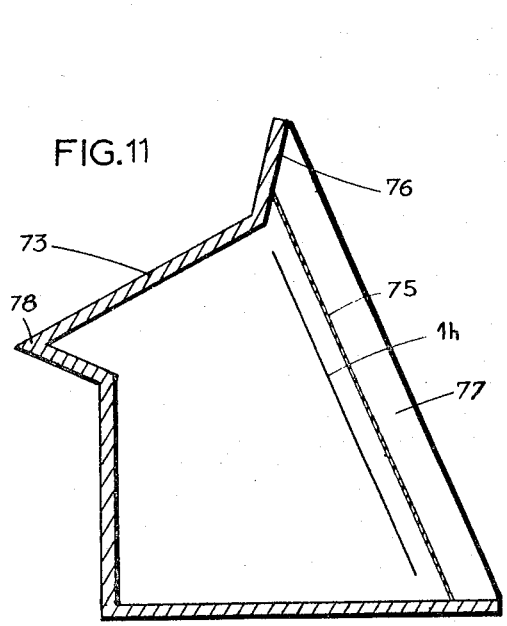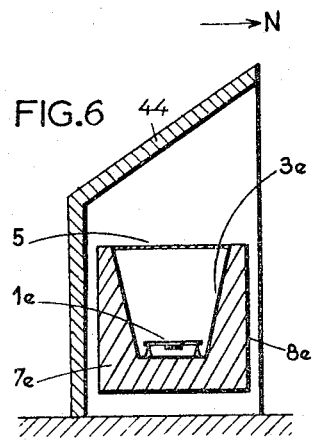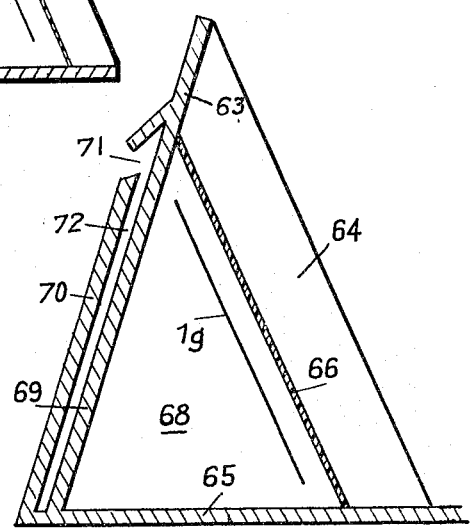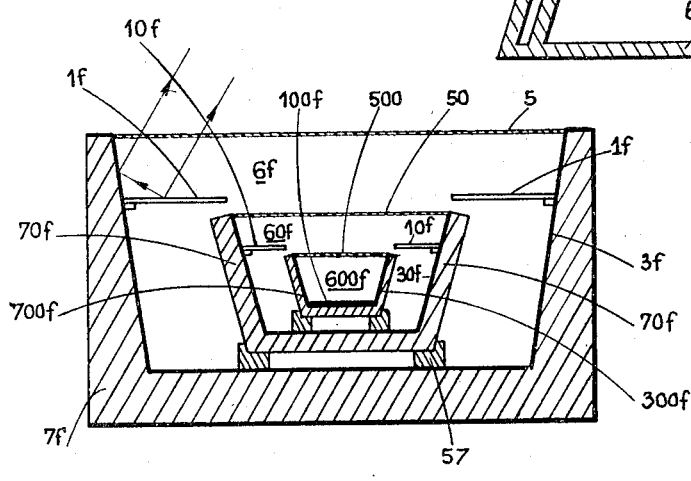

March 21, 1967  F. TROMBE  3,310,102
DEVICES FOR LOWERING THE TEMPERATURE OF
A BODY BY HEAT RADIATION THEREFROM
Filed Oct. 14, 1965  9 Sheets-Sheet 9

United States Patent Office 3,310,102
Patented Mar. 21, 1967

3,310,102
DEVICES FOR LOWERING THE TEMPERATURE OF A BODY BY HEAT RADIATION THEREFROM
Felix Trombe, Paris, France, assignor to Centre National de la Recherche Scientifique, Paris, France
Filed Oct. 14, 1965, Ser. No. 495,922
Claims priority, application France, June 23, 1962, 901,741; Dec. 27, 1962, 919,861; Jan. 29, 1963, 922,935; July 27, 1964, 983,175
27 Claims. (Cl. 165—133)

The present invention is a continuation-in-part of my prior applications, Ser. No. 288,323, filed on June 17, 1963, for "Improvements in Devices for Lowering the Temperature of a Body by Heat Radiation Therefrom," and now abandoned, and Ser. No. 474,294, filed on July 23, 1965, for "Improvements in the Cold Producing Devices by the Lowering of the Temperature of a Radiating Body, Namely in Those for Cooling Buildings," and now abandoned.

It is known that, in thermodynamics, the term "black body" designates a body which radiates an energy proportional to the fourth power of its absolute temperature. This radiated energy is still considerable at ordinary temperature and even well below 0° C., as shown by the following table:

TABLE I.—ENERGY RADIATED BY THE BLACK BODY

| Temperature | | Total energy radiated per m.² (Stefan's law), watt/m.² |
|---|---|---|
| °C. | °K. | |
| 90 | 363 | 1,000 |
| 50 | 323 | 625 |
| 40 | 313 | 546 |
| 20 | 293 | 419 |
| 0 | 273 | 316 |
| −20 | 253 | 233 |
| −50 | 223 | 130 |

On the other hand, within the above mentioned temperature ranges, the radiated energy is wholly within the infra-red range, extending practically from 4 to 25 microns. The maximum energy emission wavelength $\lambda_m$ (the value of which, as it is known, is proportional to the reverse of the absolute temperature) ranges from 9.5 microns (when the temperature of the black body is +40° C.) to 13 microns (when the temperature of the black body is −50° C.).

The emission of energy from the black body, if the latter received no external energy, in particular by radiation, would take place at the expense of its own thermal reserve. It would therefore theoretically come, after a time depending upon its calorific capacity, close to the absolute zero.

As a matter of fact, at the level of the earth ground, the loss of energy by radiation of the black body is partly compensated for by radiations received from the atmosphere and, in the absence of insulation, by heat transmitted, on the one hand, by conversion from the surrounding mass of air and, on the other hand, by conduction from the earth surface. To the radiation of the atmosphere within the infra-red range are added the sun rays diffused by the atmosphere during the daytime and the wavelengths of which range chiefly from 0.3 micron (ultra-violet) to 3–4 microns.

However, it has been noted that the infra-red radiation of the atmosphere has a noncontinuous spectrum, most of this radiation taking place within the wavelength ranges corresponding to the absorption bands of steam, carbonic acid gas and ozone, and consequently there remain wavelength bands within which the atmosphere does not radiate and for which it is practically nonabsorbing. In what follows, these bands will be designated by the term "windows of the atmosphere." The radiations from the black body taking place within the wavelength bands corresponding to said "windows of the atmosphere" can therefore (especially when the weather is clear) pass through the atmosphere without being absorbed and go off to the space beyond said atmosphere. The most important of these windows of the atmosphere ranges from 8 to 13.5 microns (with only an ozone absorption band from 9.4 to 10 microns). Other windows can also be cited, in particular a very small one near 6 microns and another one ranging from 16 to 24 microns. It will be noted that the energy emission maximum wavelengths $\lambda_m$ of the black body at the temperatures considered in the above table are in fact located within the said windows of the atmosphere.

From what precedes it follows that, if account is not taken of the exchanges of energy by radiation between a black body and the external medium, the energy lost by said terrestrial black body into space may be greater than that it receives from the outside.

The energy finally lost by a terrestrial black body radiating into space by clear weather and without any mask into a solid angle of $2\pi$ steradians is about equal to ⅓ of the total theoretical radiated energy such as indicated in the above Table I. Therefore, in the best possible conditions, this lost energy would be that indicated in the following Table II as a function of the temperature.

TABLE II.—ENERGY RADIATED IN THE BEST POSSIBLE CONDITIONS ON THE SURFACE OF THE EARTH

| Temperature in ° C.: | Energy radiated toward space per m.² of black body, watt/m.² |
|---|---|
| 90 | 333 |
| 50 | 208 |
| 40 | 182 |
| 20 | 130 |
| 0 | 105 |
| −20 | 78 |
| −50 | 43 |

These values are still very great and should enable bodies having a high coefficient of emission (black bodies) and suitably protected against thermal transfer from the earth surface, to reach very low temperatures, merely as a consequence of their outward radiation.

However, experience teaches that the result that is obtained is relatively small, as compared with the importance of the radiated energy.

In particularly favorable conditions, a flat surface having the characteristics of a black body and thermally insulated from the ground reaches, with a very clear sky, in the absence of wind, with dry weather, in the absence of any terrestrial mask, a temperature lower by about 9° C. than the temperature of the ambient air ($\Delta t=9°$ C.). In the presence of wind, even very small, the convection exchanges are increased and the temperature difference $\Delta t$ decreases considerably. Likewise, in the presence of moist air, the radiating black body acts as a water or ice condenser and this temperature difference $\Delta t$ is only from 3 to 5° C.

The object of the present invention is to provide arrangements for obtaining black body temperatures much lower than that of the surrounding air, such temperatures permitting practical applications, for instance for the production of cold air or even of ice.

The present invention consists in a cold producing device which comprises, in combination, an infra-red rays radiating body capable of giving off rays within the wavelength bands for which the atmosphere is transparent thereto, means partly surrounding said radiating body for thermally insulating it from the earth and for preventing the radiations from the sun and from earth objects from reaching said radiating body, reflecting means inside said means shaped and positioned to reflect the radiations emitted by said body into the atmosphere within a substantial solid angle, and a screen of a material transparent to radiations of the wavelengths for which the atmosphere is transparent, out of contact with said radiating body and forming a partition between it and the atmosphere.

Such a device enables a radiating body having the characteristics of a black body to cool down more than in the case above considered where a black body flat surface thermally insulated from the ground takes, under the best possible conditions, a temperature lower by about 9° C. than the temperature of the surrounding air.

The device according to the present invention permits, in all cases, of obtaining a much greater lowering of the temperature of a radiating black body by reducing, and possibly practically eliminating, all external causes of heating of said radiating body.

By interposing a transparent screen between the radiating body and the atmosphere, air is prevented from flowing along the surface of said radiating body, but this transparent screen further has the advantage of avoiding condensation of atmospheric moisture on the radiating body.

As for the heat transmitted to the radiating body by the radiations from the atmosphere, it is very substantially reduced by the provision of opaque walls which prevent any direct radiation from the sun or from earth objects from striking the black body. The only rays diffused by the atmosphere that reach the radiating body correspond, from the point of view of energy, to only some units percent of the direct sun radiation.

If the radiating body that is chosen as above stated consists of an integral black body (this term designating any body having a continuous spectrum of emission in the infra-red range and a coefficient of absorption close to 100% for all radiations), such as a support coated with soot or lamp black, all radiations, including the sun rays diffused by the atmosphere, will be absorbed by said radiating body.

However, it is possible substantially to increase the ratio of the loss of energy of the radiating body by radiation to its absorption of radiated energy, at least during the daytime, by making use of a body which behaves like a black body for infra-red radiations of a wavelength greater than 3 microns (and in particular within the range from 3 to 15 microns which includes the most important "windows of the atmosphere") and as a reflector for radiations of lower wavelengths down to ultra-violet radiations. Such a body will be called "selective radiating body."

These radiations, in particular the sun rays, of wavelengths lower than 3 microns, will consequently produce practically no heating of the radiating body whereas said body keeps all its possibilities of radiation toward space within the infra-red range. For instance such a radiating body may consist of an aluminum surface coated with a layer of alumina 10 microns thick or still of oxides or salts such as $CaO$, $MgO$, $CO_3Ca$, $TiO_2$, $ZnO_2$ either associated or not with a pigment.

A body such as glass, which is transparent to radiations of wavelengths ranging from the ultra-violet to 2.5 and 3 microns and which behaves as a black body for infra-red radiations, would lead to the same results, provided that the above mentioned opaque walls are located on the internal reflecting surface in such manner that the sun rays diffused by the atmosphere which pass through the radiating body are subsequently returned directly into the atmosphere.

The lowerings of temperature of selective radiating bodies of this kind are substantially greater during daytime than those obtained with integral black bodies of the same shape arranged in the same manner.

The absorption coefficient of a selective radiating body (averaging from 90 to 95%) being a little smaller than that of an integral black body, it follows that, during night time, the energy emission of said selective radiating body will be a little lower than that of an integral black body. The temperature thereof will therefore tend to drop a little less rapidly than that of an integral black body. However, the total energy balance resulting from the addition of the losses of energy by radiation both during daytime and during night time is very much in favor of the selective radiating body.

The ideal selective radiating body would be one capable of absorbing and therefore emitting radiations within wavelength ranges corresponding to the above mentioned windows of the atmosphere and wholly transparent to all other radiations.

If account were taken only of the thermal exchanges by radiation of such a body with the atmosphere, said body would cool down very quickly. The radiations from the atmosphere would pass through it without being absorbed, that is to say without yielding energy thereto, whereas said body would give off into space the radiations not absorbable by the atmosphere.

Polyvinyl chloride is very close to this ideal body since it is characterized by a strong absorption of the radiations the wavelengths of which range from 8 to 14 microns, with respect to which it therefore behaves as an opaque body. It is transparent to radiations of wavelengths lower than 4 microns, in particular to most of the sun rays, and semi-transparent to radiations of wavelengths of a value higher than 14 microns.

The radiating body should of course have a shape enabling it to radiate within a solid angle as great as possible.

It will therefore be made of a flat, curved, cylindrical or spherical shape, either solid or hollow, according to the material of which it is made, to the kind of apparatus to which the device according to the invention is to be applied and also according to the shape of the internal surface which is to reflect infra-red radiations from said opaque wall.

Concerning now the means for insulating said radiating body from the earth surface and from the opaque wall partly surrounding said body to protect it against direct rays from the sun or from earth objects, they preferably consist of a heat insulating envelope the inner surface of which has a high reflective power both for the infra-red radiations emitted by said body and for the sun radiations. The external surface of this envelope is advantageously coated with paint capable of reflecting sun rays. This envelope should be positioned in such manner that the radiating body never receives direct rays from the sun.

Finally, the inner surface of this envelope must have a shape such that, on the one hand, most of the infra-red rays issuing from the radiating body that impinge upon said inner surface are reflected toward space without possibility of returning to the radiating body and that, on the other hand, the radiations diffused from the atmosphere which penetrate into the inside of the envelope are returned by reflection to the outside as quickly as possible.

The inner surface of this envelope advantageously consists of non-oxidized aluminum which reflects 99% of the infra-red rays, this surface having a shape adapted to that of said radiating body so that said body can radiate outwardly within a solid angle of maximum value, the rays inside said solid angle being reflected toward space without possibility of returning to said black body.

Said surface will have for instance one of the following forms: frustum of a cone, frustum of a pyramid, surface having involute-shaped cross sections limited by plane or cylindro-parabolic surfaces, cylindro-parabolic surfaces limited by parabolic surfaces or by plane surfaces, and elliptical surfaces with various limited profiles.

The external surface of this envelope is preferably coated with a selective paint capable of reflecting sun rays, for instance a titanium oxide paint, of the rutile type.

Of course, there may be provided, about said heat insulating envelope, supplementary envelopes made of panels the inner surfaces of which are capable of reflecting the infra-red rays radiated by said radiating body and the external surfaces of which are coated with a paint, for instance a titanium oxide paint of the rutile type, for reflecting sun rays in such manner as further to increase the protection of the radiating body located inside said heat insulating envelope.

Furthermore, concerning the above mentioned transparent screen interposed between the radiating body and the atmosphere, it should be as transparent as possible within all wavelength bands, in particular within the band corresponding to the wavelengths of the sun rays diffused by the atmosphere and within the interval of the wavelengths ranging from 3 to 25 microns which, as above indicated contains the most important "windows of the atmosphere," so that said screen cannot have any influence upon the thermal exchanges by radiation between the radiating body and space.

As a matter of fact, if this screen had a substantial absorption for some wavelength bands, in particular for those corresponding to the windows of the atmosphere, its own temperature would be lowered and it would constitute a zone of condensation of atmospheric moisture, this condensed water then forming a screen preventing the passage of the rays emitted by the radiating body. This would very quickly limit the drop of temperature of said body.

Advantageously this screen consists of at least one polyethylene sheet.

According to an advantageous feature of my invention, the heat insulating envelope having an internal wall capable of reflecting infra-red rays and the transparent screen will constitute together, about the radiating body, a practically closed structure, the frigories produced by the radiation of said radiating body being then either used directly within this structure or collected in any suitable manner, in particular by circulation of gas about the radiating body, apertures being for instance provided in said practically closed structure for introducing the gas to be cooled and for collecting the gas cooled by contact with the radiating body.

The thermal insulation of the radiating body may be increased by superposition of several thin sheets permitting the passage of the infra-red radiations.

In order to obtain the best possible thermal insulation a distance of from 4 to 5 centimeters should be provided between the radiating body and said sheet.

In a likewise manner, a distance of the same order of magnitude should be provided between two such sheets, so as to imprison cooler and cooler air layers between them.

It should be noted that only the external transparent wall must have a substantial resistance to atmospheric agents such as wind and moisture. The other sheets may be thinner and consequently more transparent to the infra-red rays radiated by the radiating body.

Preferred embodiments of the present invention will be hereinafter described with reference to the appended drawings, given merely by way of example, and in which:

FIGS. 1 to 6 inclusive are sectional views of embodiments of the present invention;

FIG. 9 is an elevational sectional view of another embodiment of a cooling plant of the kind of that shown by FIGS. 7 and 8;

FIGS. 10 and 11 are diagrammatic vertical sections of devices according to the invention serving to cool down the air of a building;

FIG. 15 is a section on the line XV—XV of FIG. 14;

FIG. 16 is a longitudinal section on a smaller scale of a device such as shown by FIG. 14 in one application thereof;

FIG. 17 shows in longitudinal section a modification of the device of FIG. 14;

FIG. 1 shows a cooling device according to the present invention including a flat radiating body 1 the temperature of which can be measured at 2.

Figure 4:
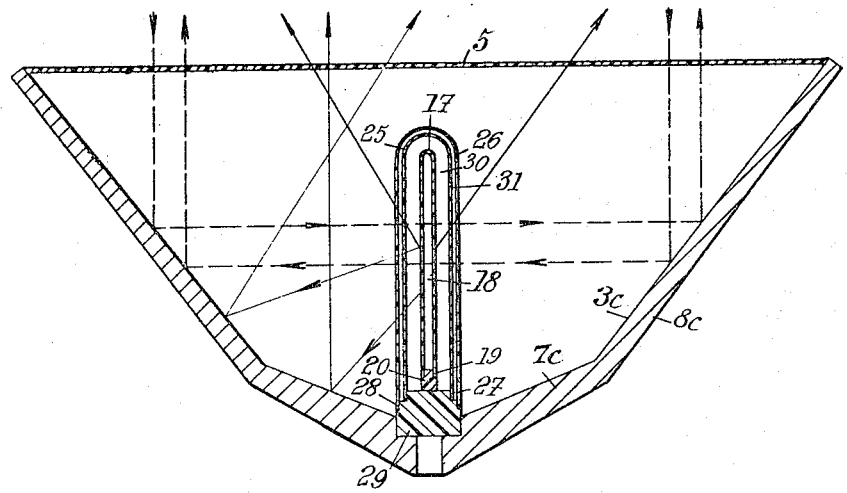

This radiating body 1 may be either an integral black body or a selective black body as above described. It may consist for instance of a sheet of aluminum covered by oxidation with a 10 micron thick layer of alumina.

About this radiating body is provided a reflecting lining 3 forming a frustum of a pyramid. This lining is so shaped and so disposed about the radiating body that direct rays from the sun and from earth objects cannot strike said radiating body. The whole should therefore be directed toward the north, indicated by arrow N. Said lining is made of nonoxidized aluminum. Such an arrangement therefore enables the radiating body to radiate freely within an angle of $2\pi$ steradians, any ray 4 emitted by said radiating body within this solid angle passing into space either directly or after one reflection.

Across said lining 3 there is provided a polyethylene screen 5 transparent to all radiations. The thickness of this screen can be as low as 5 microns. For practical purposes, its thickness is, for instance, 50 microns. With this arrangement radiating body 1 is located inside a closed chamber 6 heat insulated from the surrounding air and from the earth surface and which imprisons a mass of air cooled down by its contact with said radiating body 1.

Along said lining 3 there is provided a heat insulated envelope 7 consisting, in a known manner, of any suitable material such as glass wool, slags, organic masses, expanded cork, felt, down, and so on. Said heat insulating envelope 7 is provided, on its external surface 8, with a paint consisting chiefly of titanium oxide of the rutile type reflecting sun rays and radiating in the infrared range.

FIG. 2 shows an analogous device but wherein the radiating body 1a has a cylindrical surface and cooperates with a lining 3a capable of reflecting infra-red rays and having the shape of an involute of said cylindrical radiating body 1a, the end portions 13a of this lining located on the outside of screen 5 being flat.

The side walls of this device on either side of the plane of the figure consist of reflecting planes inclined with respect to each other at about 30°, the apex of the dihedral angle thus formed being directed toward the south. Thus practically all the rays 4 issuing from the radiating body 1a are sent into space without possibility of returning onto said body 1a, either directly or by reflection upon lining 3a–13a.

The radiating body is, as in the case of FIG. 1, insulated from the surrounding air by a screen 5 and envelope 3a is likewise heat insulating.

FIG. 3 shows a device analogous to that of FIG. 2 with a radiating body 1a of cylindrical shape cooperating with an infra-red rays reflecting wall 3b which in this case has a cylindro-parabolic shape. The side walls of the apparatus on either side of the plane of the figure consist of reflecting plane making with each other an angle of 30°. This wall shape also gives very satisfactory results concerning the radiation of the radiating body within a solid angle as great as possible.

Of course the device of FIG. 3 might be modified and made of revolution, cylinder 1a being replaced by a sphere and cylindro-parabolic reflector 3b being replaced by a paraboloid of revolution. The efficiency of the device thus obtained would be slightly higher but its construction would be somewhat more difficult.

With devices such as shown by FIGS. 1 and 3 it is possible to obtain, with a sky of medium clarity and with a relatively high hygrometric state of the atmosphere, black body temperatures lower by more than 16° C. than those of the surrounding air. It is important to note that this result was obtained both during daytime and during night time. With a clear sky and a dry atmosphere, the temperature difference should be of the order of 20° C.

The radiating bodies of FIGS. 2 and 3 might have been made of polyvinyl chloride the selectivity of which is still greater than that, for instance, of aluminum covered by oxidation with a layer of alumina.

The use of polyvinyl chloride will be described in a more detailed fashion with reference to FIGS. 4 and 5 which show supplementary improvements of the devices according to the invention in order to obtain a still greater lowering of the temperature of the radiating body, these improvements, consisting in providing several chambers juxtaposed about the radiating body, these chambers containing limited volumes of air which are cooler and cooler when getting nearer to said radiating body.

In FIG. 4 the radiating body therefore consists of a sheet 17 of polyvinyl chloride folded upon itself in such manner as to leave, between its two parallel portions, a limited air volume 18 which forms a kind of cold chamber.

The opposed edges of said sheet 17 are applied against the wall 19 of a parallelepipedal piece 20 made of a thermally insulating material.

As in the constructions of FIGS. 1 to 3, heat insulating envelope 7c is provided, on its inner surface, with a layer 3c of nonoxidized aluminum and, on its external surface, with a layer 8c of a paint capable of reflecting the sun rays, envelope 7c being limited, on either side of the plane of the drawings, by inclined reflecting planes making with each other an angle of 15° opening toward space.

On the ends of said walls 7c there is fixed a screen 5 of polyethylene thus separating the radiating body 17 from the surrounding air.

Insulation of the radiating body from the external medium is further increased by the use of two supplementary transparent screens of polyethylene consisting of sheets 25 and 26 which surround the radiating body 17 and the opposed edges support 29 which also carries piece 20.

The lateral faces of the volumes thus limited respectively by sheets 25 and 26 are closed for instance by pieces of polyethylene welded on their edges to the side edges of said sheets 25 and 26.

Thus, two supplementary juxtaposed gastight chambers 30 and 31 are formed about radiating body 17. The temperature therefore decreases when passing successively from the chamber limited by lining 3c and transparent screen 5 to chambers 31, 30 and 18.

The radiating body 17 is advantageously made of a sheet of polyethylene chloride 100 microns thick, and screens 25 and 26 consist of sheets of polyethylene 50 microns thick. The curves of FIGS. 12 and 13 serve to illustrate the cooling of the radiating body.

Figure 13:
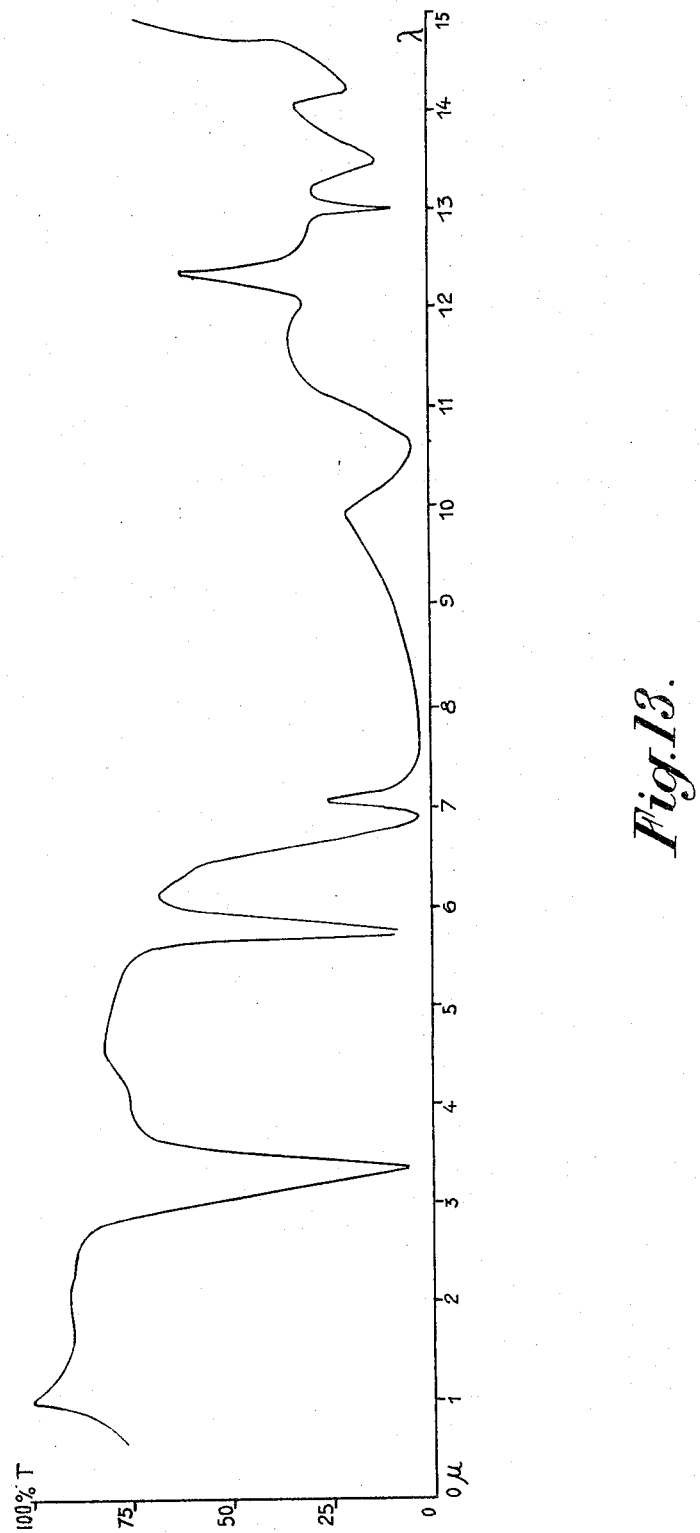

FIG. 13 shows the transparency to incident radiations of a sheet of polyvinyl chloride 100 microns thick (this transparency being plotted in percentage values in ordinates) as a function of the wavelengths of said radiations (the wavelengths being plotted in microns in abscissas). It will be noted that this sheet of polyvinyl chloride behaves substantially as a black body for the radiations within the band of wavelengths ranging from 7 microns to 14.5 microns, that is to say within the band corresponding substantially to the chief window of the atmosphere (from 8 to 13.5 microns), whereas, with the exception of very narrow absorption bands, polyvinyl chloride is substantially transparent to radiations of wavelengths lower than 5.5 microns, that is to most of the sun rays diffused by the atmosphere. It results from what precedes that the polyvinyl chloride radiating body 17 will emit radiations preferentially in the above mentioned windows of the atmosphere, these radiations being lost into space.

Figure 12:
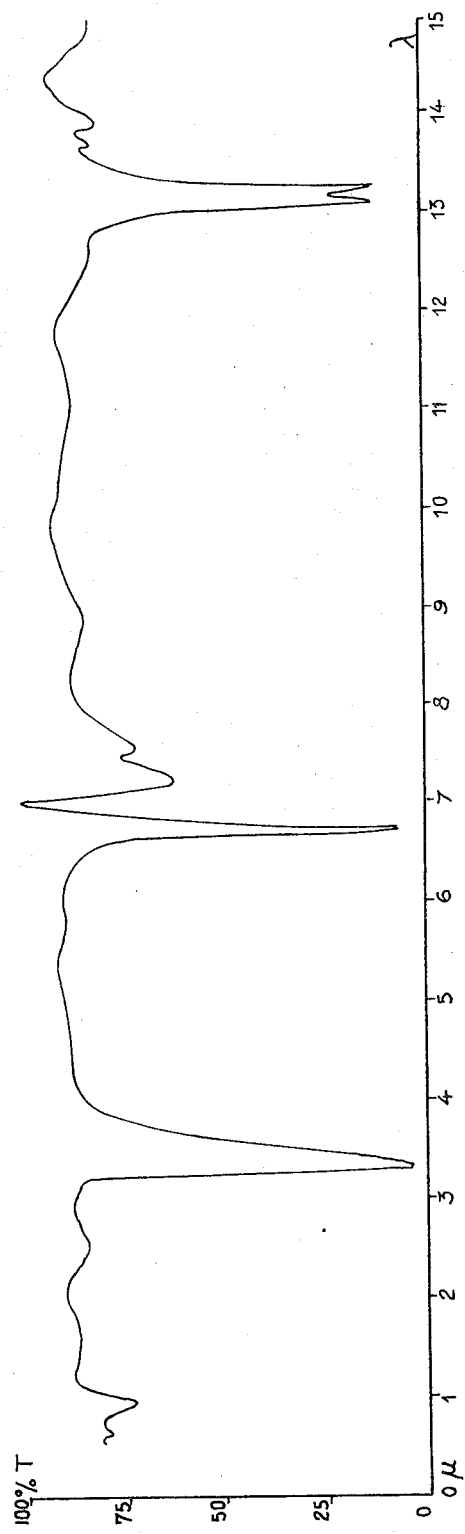
FIGS. 12 and 13 show curves indicating, in ordinates, the transparency to radiations respectively of a polyethylene sheet of a thickness equal to 50 microns and of a polyvinyl chloride sheet of a thickness of 100 microns, the wavelengths of the incident radiations being plotted in abscissa.

FIG. 12 shows the curve of transparency to incident radiations of a polyethylene sheet 50 microns thick as a function of the wavelengths of said radiations in the same conditions as in FIG. 13. It will be found that this polyethylene sheet is transparent to more than 80% for all wavelengths ranging from ultra-violet to 15 microns, with the exception of some very narrow peaks of absorption near 3.3 microns, 6.8 microns and 13.2 microns.

Consequently, in the device shown by FIG. 4, the radiations from radiating body 17 will pass into space after travelling successively through transparent screens 25, 26 and 5 either directly or with reflection on the internal surface 3c of wall 21.

On the contrary the diffused rays from the atmosphere which fall upon reflecting lining 3c and the wavelengths of which chiefly range from the ultra-violet to 3 microns, will pass without being absorbed through screens 25 and 26 and radiating body 17 itself without heating said body before being returned into space. In view of the fact that the transparency of these obstacles is not perfect, it will be, of course, advisable to avoid as much as possible parasitic reflection which would cause the rays from the atmosphere to pass several times through the system consisting of radiating body 17 and screens 25 and 26.

The following table shows the lowering of temperature obtained in the inner chamber 18 of radiating body 17 in a device according to FIG. 4 making use of sheets of polyethylene and of polyvinyl chloride of the respective thicknesses above mentioned, the temperature being measured in this chamber 18 for instance at the bottom thereof (this measurement being made at successive time intervals over a total duration of 36 hours on Dec. 3 and 4, 1952, at Montlouis, Pyrenees-Orientales, France).

| Times of the measurement | Ambient temperature | Temperature in space | $\Delta t$ |
| --- | --- | --- | --- |
| 4  | −5    | −26   | −21   |
| 10 | +2    | −24   | −26   |
| 12 | +10.5 | −20.5 | −31   |
| 16 | +7    | −19   | −26   |
| 20 | −3    | −24   | −21   |
| 24 | −6    | −25.5 | −19.5 |
| 4  | −6.5  | −25   | −18.5 |
| 10 | 0     | −24.5 | −24.5 |
| 12 | +2.5  | −21   | −23.5 |
| 16 | +1    | −18   | −19   |

In the third and second columns of this table are indicated the temperatures of the ambient air and the temperature in chamber 18, respectively, at the times indicated in the first column. It will be noted that the difference between the temperatures existing respectively in cold chamber 18 and on the outside increases with the external temperature, the maximum value of this difference being 31° C. These differences, which are given in the fourth column of the table, bring into evidence the efficiency of cold producing devices according to the invention.

Figure 5:
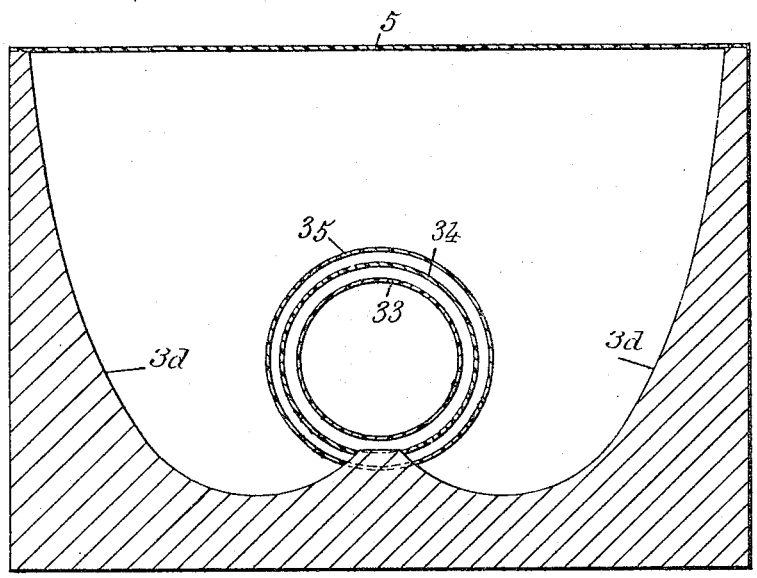

The device shown by FIG. 5 is based upon the same principle as that of FIG. 4. The only difference is concerned with the shapes of the different parts of the device, in order to improve the results obtained.

The radiating body 33, preferably made of polyvinyl chloride, consists of a cylindrical sheet surrounded by a transparent screen consisting of two cylindrical sheets 34 and 35, preferably made of polyethylene, closed at their lower ends by walls, also made of polyethylene, assembled by welding. The whole is associated with an infra-red rays reflecting lining 3d preferably associated with a supplementary polyethylene screen 5 stretched across the edge of lining 3d. Said lining 3d has the shape of an involute of a cylinder. Owing to this arrangement, all the rays emitted by the radiating body are sent to the outside and furthermore all the diffused rays from the atmosphere are allowed to pass at most only one time through the system consisting of said radiating body and of the two screens 34 and 35.

It is also possible to obtain a device having a better efficiency by improving the insulation of the body radiating the rays diffused by the atmosphere.

Such a device is shown by FIG. 6, which discloses the provision about a cooling device, made practically in accordance with the disclosure of FIG. 1, of supplementary walls 44 surrounding, on the east, on the south and on the west, above and below, the heat insulating envelope 7e, the inner surface 3e of which is adapted to reflect infra-red rays and the outer surface of which is coated with a layer 8e of a paint capable of reflecting sun rays, this envelope containing a radiating body 1e.

A transparent screen 43 stretched across the edges of envelope 7e forms a partition separating said radiating body from the ambient air.

The east and west vertical walls form with the south wall (which is shown in section by FIG. 6) angles which are advantageously of 105°.

The portion of wall 44 provided about envelope 7e is inclined on the horizontal so as to permit the radiations issuing from said envelope 7e to be reflected toward the north, indicated by arrow N.

Envelope 7e and walls 44 have their inner surfaces capble of reflecting infra-red rays, advantageously made of nonoxidized aluminum, and their external surfaces coated with a paint which reflectes sun rays, advantageously consisting chiefly of titane oxide.

With a radiating body 1e made of a flat surface of aluminum covered by oxidation with a layer of alumina and a screen 5 made of polyethylene 50 microns thick, the following results were obtained.

| Date of the experiments | Time | External temperature | Temperature of the black body 1e | $\Delta t$ |
|---|---|---|---|---|
| 11/15/62 | 1 | −3.5 | −21.5 | −18 |
| 11/29/62 | 14 | +5.5 | −16.4 | −21.9 |
| 12/1/62 | 4 | +3 | −18 | −21 |
| 12/1/62 | 12 | +8.5 | −17 | −25.5 |
| 12/2/62 | 4 | −2 | −23.5 | −21.5 |
| 12/2/62 | 12 | +2 | −18 | −20 |
| 12/3/62 | 4 | −5 | −25.5 | −20.5 |
| 12/3/62 | 12 | +7.5 | −22 | −29.5 |

These experiments were made at Montlouis, Pyrenees-Orientales, France, the atmosphere having a relative moisture of 40%.

In this case also there is noted an increasing efficiency of the devices according to the invention when the external temperature rises.

Figure 7:
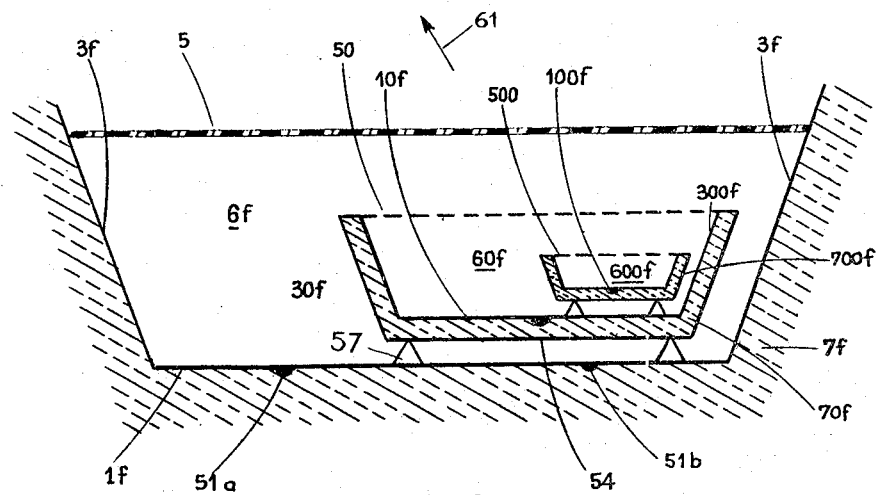
FIG. 7 is an elevational sectional view of a plant comprising several cooling devices placed within one another, according to the invention.
Figure 8:
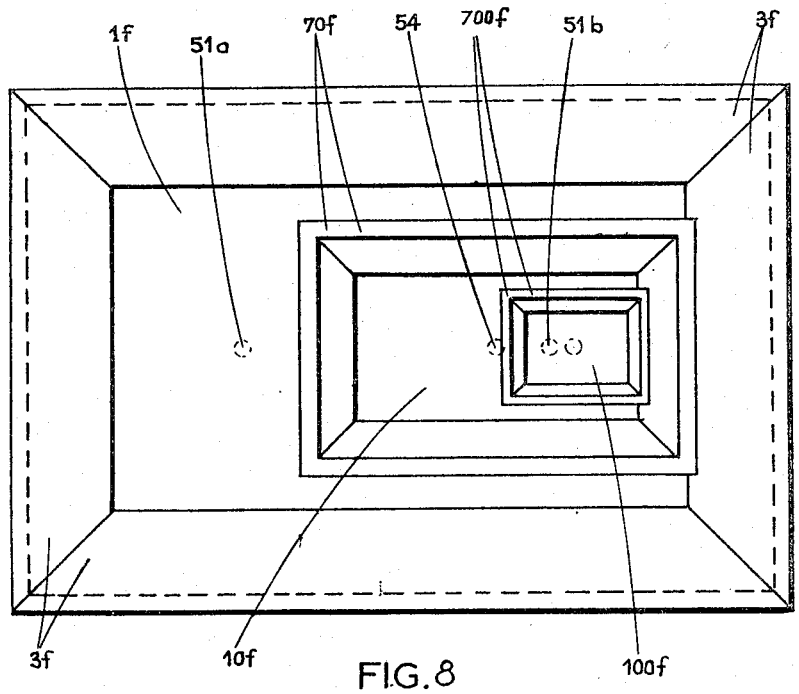
FIG. 8 is a plan view of the plant of FIG. 7.

FIGS. 7, 8 and 9 show arrangements including several of the devices above mentioned placed in one another, as hereinafter described, such arrangements making it possible to obtain very important lowerings of the temperature of the radiating body.

Referring to FIGS. 7 and 8, which show in section and in plane view, respectively, a system according to the invention, there is provided a first device of the kind illustrated by FIG. 1 comprising a flat radiating body 1f disposed at the bottom of a heat insulating envelope 7f the inner side surfaces 3f of which advantageously have the shape of a frustum of a pyramid and consists of nonoxidized aluminum. A transparent screen 5 made of polyethylene is stretched between said side walls, thus limiting a closed space 6c in which is imprisoned a limited volume of air in contact with radiating body 1f, the temperature of which may be measured for instance at two points 51a and 51b.

On the inside of this space 6f there is provided a second structure made exactly as the above mentioned one, that is to say comprising a heat insulating envelope 70f having reflecting inner faces 30f, a radiating body 10f the temperature of which can be measured at 54, a polyethylene screen 50 limiting inside said second structure a space 60f containing a smaller volume of air in contact with radiating body 10f.

In view of the fact that this second structure is placed in an atmosphere 6f already cooled with respect to the external atmosphere, a still more important lowering of the temperature of radiating body 10f with respect to the external air than for radiating body 1f will be obtained.

Of course, the contacts between the first and second structure must be limited as much as possible in order to avoid heat transfer by conduction between them. This is obtained by using, for the second structure, insulating supports 57 resting upon the bottom of chamber 6f. These insulating supports 57 have a cross section as small as possible to enable the circulation of cold air.

A third structure similar to the preceding ones is provided inside the second space 60f. The temperature of the radiating body 100f of this third structure, measured at 60, is still lower than that of the radiating body 10f. The polyethylene screen is shown at 500, and the heat insulating envelope at 700f with its inner walls 300f.

The system illustrated by FIG. 7 is inclined toward the right and toward the north, arrow 61 indicating the vertical direction. Thus the cold air produced in the respective stages has a tendency to flow from the left toward the right.

The performance of such a system is still further improved by locating, as shown by FIG. 9, radiating bodies 1f and 10f in spaces 6f and 60f, respectively, no longer at the bottoms of said spaces but at a small distance under the respective screens 5 and 50, so as to avoid that a portion of the rays that are emitted is stopped by the respective lower walls of envelopes 70f and 700f.

The total solid angle for the radiations from every radiating body 1f and 10f thus remains practically equal to the value it would have in free air. The radiating body 1f of the first chamber arranged in this manner further permits of more efficiently cooling the polyethylene screen 50 of the second structure. Likewise, the transparent screen 500 of the third structure or stage is more efficiently cooled. The following table shows the temperature drops that have been obtained in contact with the radiating body 100f (each of the radiating bodies 1f, 10f and 100f consisting of an aluminum sheet covered with a layer of alumina) inside the third space 600f, in a system as shown by FIG. 9.

Experiments performed between December 1 and 4 at Montlouis, Pyrenees-Orientales, France, at the altitude of 1600 meters with a dry clear weather and a relative moisture averaging 40%.

| Date | Time | External temperature | Temperature of the radiating body, 100f | Δt |
|---|---|---|---|---|
| 1/12/62 | 21 | −2.5 | −24 | 21.5 |
| 2/12/62 | 2 | −2 | −27.2 | 25.2 |
|  | 6 | −1.8 | −27.9 | 26.1 |
|  | 12 | +4.5 | −17 | 21.5 |
|  | 16 | +2.5 | −18 | 20.5 |
|  | 23 | −4 | −27 | 23 |
| 3/12/62 | 4 | −5 | −30 | 25 |
|  | 8 | −6.5 | −33 | 26.5 |
|  | 12 | +10.5 | −19.5 | 30 |
|  | 16 | +7 | −17 | 24 |
|  | 24 | −6 | −29 | 23 |
| 4/12/62 | 5 | −6.2 | −29 | 22.8 |
|  | 9 | −5 | −29.5 | 24.5 |
|  | 11 | +1.5 | −27 | 28.5 |
|  | 15 | +2.5 | −21 | 23.5 |
|  | 17 | −1 | −22 | 21 |

It goes without saying that, in all the embodiments of the devices according to the invention which have been above described, the frigories produced in the radiating body and in contact therewith may be used or recuperated as above considered, the means to be used for these purposes having not been shown in FIGS. 1 to 9.

A very interesting application of the devices according to the present invention is illustrated by FIGS. 10 and 11, this application concerning the air conditioning of buildings.

FIG. 10 diagrammatically shows a vertical section by a north-south plane of a building made according to the present invention. This building comprises heat insulating walls turned toward the west, the south and the east (64 being the east wall and 63 the south wall) and a heat insulated floor 65 insulated from the ground. The north wall of the building is at least partly constituted by a screen 66 transparent to radiations of all wavelengths, the envelope having the shape of a tent. The flat radiating body 1g is provided behind screen 66. Walls 63 and 64 and floor 65 have inner lining capable of reflecting infra-red rays. This structure constitutes, on the scale of a building, a device having all the characteristics of the invention, the limited volume of air being imprisoned in a space 68 in contact with the radiating body 1g, the circulation of cold air in this space being obtained by the mere effect of gravity.

Insulation of the side walls of the building may be further provided by making them, as shown by FIG. 10 for the south wall 63, in the form of double panels 69 and 70 opening at the top at 71 to permit the accumulation of cold air in the intermediate recess 72. The external panel 70 has an inner surface capable of reflecting infra-red rays and an outer surface capable of reflecting sun rays.

FIG. 11 shows a building of the same kind as that of FIG. 10 but provided with a roof 73. A flat radiating body 1b extends nearly to the top of said roof and is protected by a transparent screen 75 and by reflecting surfaces such as 76 and 77. Roof 73 preferably has a projecting portion 78 acting as a sun protection for the side walls of the building.

By way of example here are the results obtained with the device of FIG. 10. The radiating bodies (aluminum covered with a layer of alumina) have an area of 6 m.² and serve to cool down a cavity in the form of a tent having an area of 3 m. × 3 m. at the basis and 3 m. high. Date: Sept. 24, 1962. Experiments made in Montlouis, Pyrenees-Orientales, France, with a dry and clear weather, the relative moisture averaging 40%.

| Time | Ambient temperature | Temperature of the radiating body 1g | Temperature of the air in the building |
|---|---|---|---|
| 0 | +7 | −6 | −3 |
| 2 | +6.5 | −6.5 | −3.5 |
| 4 | +6.5 | −7.7 | −4.5 |
| 6 | +8 | −8.5 | −5 |
| 8 | +15 | −7.5 | −4.5 |
| 10 | +20 | −3.5 | −0.3 |
| 12 | +22 | +0.3 | −4 |
| 14 | +23 | +2.5 | +6.5 |

When the radiating bodies 1g and 1h of FIGS. 10 and 11 respectively consist of one or several sheets of polyvinyl chloride, said sheets permit, while producing cold in the room to be conditioned, of allowing light diffused from the sky to penetrate into said room. This light should be reflected toward the outside either again through the polyvinyl chloride sheets or through other windows provided in other walls of the building. These last mentioned windows must be protected as much as possible through external reflectors (not shown) disposed in such manner as to reflect into the atmosphere the maximum of direct external radiations that would fall on said windows.

It is also possible to make use, in a row of buildings extending in the north-south direction, on the surfaces of their roofs turned toward the north, of cooling radiators associated with transparent and insulating screens as shown for instance by FIG. 11, the surfaces of said roofs turned toward the south forming reflectors for the infra-red rays radiated by the radiating bodies disposed on the surfaces turned toward the north.

Figure 14:
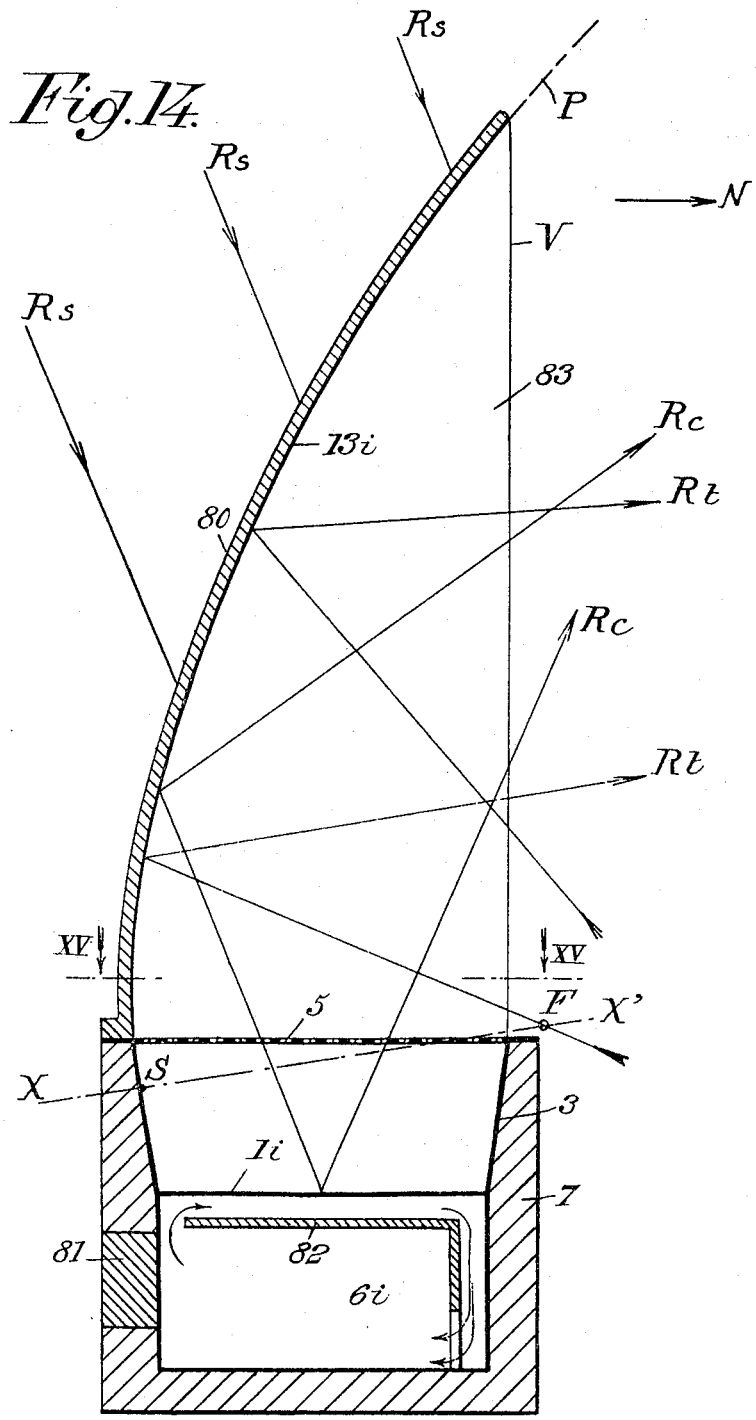
FIG. 14 is a longitudinal section of a cold producing device made according to still another embodiment of the invention.

FIG. 14 shows another embodiment of a cold producing device according to the invention, for cooling a chamber 6i.

This device comprises in particular the means above disclosed, that is to say:

A radiating body 1i emitting infra-red radiations, in particular in the wavelength bands for which the atmosphere is transparent (windows of the atmosphere), said radiating body being, for instance, an aluminum surface coated either with a layer of alumina about 10 microns thick or with a paint the main component of which is titanium oxide, the shape of said radiating body being for instance plane, curved, cylindrical or spherical, etc.;

A heat insulating envelope 7 made of a suitable insulating material, partially surrounding said radiating body 1 and isolating it from contact with the earth, the inner surface of said envelope 7 carrying a lining 3 highly reflective in particular for the radiations emitted by the radiating body 1 as well as for the sun and earth rays;

A protection screen 5 closing said envelope and defining therewith a closed space containing the radiating body 1i and isolated from the atmosphere, this protection screen, advantageously constituted by a sheet of polyethylene, being more particularly transparent in the wavelength bands corresponding to the windows of the atmosphere;

Cold chamber 6i located, preferably, below the radiating body 1i.

The present description is concerned with devices established in the northern hemisphere of the earth, where the sun rises in the east, passes through the zenith in the south direction and sets in the west.

If such devices were to be provided in the southern hemisphere of the earth it would of course be necessary to take into account the corresponding changes of orientation.

According to the invention, there is provided on the outside of the envelope 7, closed by protection screen 5, a reflecting surface 13i having a high reflective power for the radiations emitted by the radiating body 1 as well as for the solar and earth radiations, said reflecting surface 13*i* being constituted by the concave face of a wall 80 shaped substantially as a cylinder the generatrices of which are perpendicular to the plane of FIG. 14 and the directrix of which is a parabola located in this plane, this reflecting surface 13*i* being so positioned that, on the one hand, it reflects the radiations emitted by the radiating body 1 in directions above the horizon and on the other hand it prevents, by reflection and/or interception, the direct sun radiations and the earth radiations from striking the radiating body.

According to the embodiment of the invention shown by FIGS. 14 and 15 the radiating body 1*i* is of flat shape and is positioned horizontally in a parallelepipedic envelope 7, having a rectangular horizontal section, which opens at its upper part and is provided with insulating walls, the inner faces 3 of which are highly reflective for the radiations emitted by said radiating body 1*i*.

A protection screen 5 is stretched across the upper edge of said envelope to define therewith a space containing said radiating body 1*i* and insulated from the atmosphere, the portion of this space located below the radiating body 1*i* constituting the cold chamber 6*i* which is advantageously provided with a gate 81. This cold chamber 6*i* may also be advantageously provided, as shown in FIG. 14, with at least one screen plate 82 which, on the one hand, prevents the radiating body 1*i* from radiating toward chamber 6*i* and, on the other hand, favors convection movements within said chamber 6*i*. Moreover the wall surfaces 3 located immediately above said radiating body 1 are slanted with respect to the vertical to form therewith an angle of about 10 to 15° so as to give to the upper portion of the envelope 7 a form diverging slightly in the upward direction.

The dimensions of this parallelepipedic envelope 7 are chosen such that the minimum angle of incidence of any radiation emitted by body 1*i* and striking said protection screen 5 is 25°, so as to limit the partial reflection of said radiations by said protection screen 5. In the case of the construction of cold chamber 6*i* of important sizes, it will be advantageous to provide a plurality of contiguous envelopes 7 as illustrated by FIG. 15, the use of several envelopes 7 involving also other advantages pertaining to the easy positioning and the mechanical resistance of such screens 5, the thickness of which is relatively low (advantageously of about 1/10 mm.).

Envelope 7 (or the series of envelopes 7) is then disposed so as to have one of its longest sides turned toward the south.

The external wall 80 having a concave reflecting surface 13*i* is mounted on the south side of envelope 7, said reflecting surface 13*i* substantially forming an extension of the internal wall surface 3 which is turned toward the north.

The wall 80 extends along the whole length of the south side of envelope 7 and, advantageously, it has the following characteristics:

(1) The focus F of the parabolic directrix P of said surface 13*i* is located on the outside of said envelope 7, slightly above the north side thereof;

(2) The axis XX' of said parabola P is advantageously slightly oblique to the horizontal direction (by about 10 to 15°) upward from south to north, the vertex S of said parabola P being substantially located inside of said envelope 7 and on the south wall thereof, and (3) The portion of said parabola P that is used extends between the south side of envelope 7 and a vertical plane V passing approximately through the north side of said envelope 7, its exact position depending in fact upon the position of the sun at its zenith in the area of the earth where the device is to be located.

Owing to the fact that, in these conditions, the surface of the radiating body 1 is located in the area between the focal line of reflecting surface 13*i* and said surface itself, the rays $R_c$ emitted by the radiating body 1 are reflected by the reflecting surface 13*i* above the horizon; the direct rays $R_s$ of the sun are intercepted by the external face of the wall 80 and thus cannot strike the radiating body 1 and the earth rays $R_t$ are reflected by the reflecting surface 13*i* and also not allowed to strike the radiating body 1.

The protection of the radiating body 1 can be further improved, in particular against the direct rays of the sun when the latter is low above the horizon (sunrise and sunset) by providing, at least on the east side and the west side of said device, vertical screens 83 the opposed faces 83*a* and 83*b* of which are reflective for the sun rays and advantageously inclined with respect to each other (see FIG. 15) so as to eliminate by either direct or successive reflections, the direct sun rays at sunrise and at sunset.

In the case of a device comprising several envelopes 7 intermediate vertical screens of this type can be provided as partitions between the respective contiguous envelopes as shown in FIG. 15.

FIG. 16 shows a combination of devices according to the invention provided in the north wall of a building comprising several stories E. The devices, comprising envelopes 7 and walls 89, are advantageously given such a size that the height of two of them corresponds to the height of a storey. In this embodiment the cold chambers 6*i* communicate, at the bottoms thereof, with the rooms of the building and permit a circulation of cooled air along the inner faces of the walls 80.

Of course, a portion of the cold produced by such devices might be used for the cooling of refrigerating chambers.

It must be noted that in the case where these devices are used in connection with buildings having several stories it may be necessary to take into account the possible presence of neighbouring buildings which constitute sources of earth rays.

Another embodiment of the invention is shown in FIG. 17 wherein the elements similar to those of FIG. 14 have been designated by the same reference numbers.

According to this embodiment, there is provided a primary cold chamber $6_{ka}$ partly surrounding the main cold chamber $6_k$, said primary cold chamber $6_{ka}$ being located on the north side of main cold chamber $6_k$ and having its radiating body $1_{ka}$ located at a higher level than the radiating body $1_k$ of said main cold chamber (therefore nearer to screen 5 than it).

With such an arrangement, the main radiating body $1_k$ radiates in a more favorable direction than the primary radiating body $1_{ka}$, since the rays $R_c$ from the main radiating body $1_k$ are reflected more upwardly than the rays $R_{ca}$ from the primary radiating body $1_{ka}$. It is thus possible to obtain in main chamber $6_k$ a temperature lower both than that in primary chamber $6_{ka}$ and also than that which would be obtained with a single chamber arrangement such as illustrated by FIG. 14.

In the foregoing it has been assumed that the radiating body had a flat or stepped shape and that the envelope 7 had a substantially parallelepipedic form with side internal walls inclined with respect to the vertical.

Of course it would be possible to modify these devices for instance by giving the radiating body a cylindrical shape and associating therewith an envelope 7 having the form of an involute of a circle or of a parabola, the reflecting surface 13*i* being however always positioned with respect to the envelope 7 in a manner such that the radiating body 1 is entirely located in the space defined between the focal zone of reflecting surface 13*i* and this surface itself.

Figure 18:
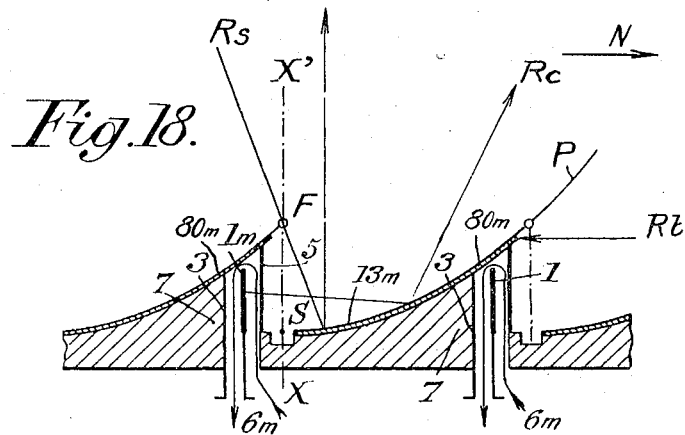
FIG. 18 is a longitudinal section of still another embodiment of the invention.

Another embodiment of the cold producing device according to the invention is shown in FIG. 18.

In this embodiment, the radiating body $1_m$ has a flat shape, is vertical and extends in the east-west direction. It is located between:

On the south side, heat insulating envelope 7 the wall surface 3 of which is highly reflective for the radiations emitted by said body $1_m$;

On the top, a reflective portion of the under face of wall $80_m$ forming a lining for heat insulating envelope 7; and On its north side, screen 5;

The space where body $1_m$ is located advantageously communicating, at its lower end, with a cold chamber $6_m$.

Advantageously, in order to facilitate the circulation of air around radiating body $1_m$, a passage is left between the top of said radiating body $1_m$ and the under face of wall $80_m$.

Wall $80_m$, the upper face $13_m$ of which is reflective, has the shape of a cylinder the directrix of which is a parabola P, the generatrices of this cylinder extending in the east-west direction over the whole length of radiating body $1_m$.

Furthermore:

(1) The focus F of parabola P is located at a short distance above the top edge of wall 80;

(2) The axis XX' of said parabola P is approximately vertical and disposed at a small distance from protection screen 5 on the north side thereof, the vertex S of said parabola P being approximately located at the level of the lowest portion of the radiating body $1_m$ and on the north side of envelope 7;

(3) The arc of the parabola that is used extends in the north direction substantially from the apex S thereof to the intersection thereof with a horizontal plane passing approximately through the upper part of the space where the radiating body is located, the exact position of said horizontal plane depending upon the importance and the origin of the earth rays emitted around the device.

It will thus be conceived that, in such a device, in which the surface of the radiating body $1_m$ is entirely located between the focal zone of the cylindro-parabolic surface $13_m$ and this surface itself, the radiations $R_c$ emitted by the radiating body $1_m$ are reflected by the reflective surface $13_m$ above the horizon in the direction of the sky, the direct rays $R_s$ originating from the sun are reflected by the reflective surfaces $13_m$ and are prevented from striking the radiating body $1_m$ and the earth rays are intercepted by the walls $80_m$ and are thus also prevented from striking the radiating body $1_m$.

In this embodiment also the rays from the sun when the latter is at a low level above the horizon (sunset or sunrise) can be deflected by vertical screens not shown in FIG. 18.

Figure 19:
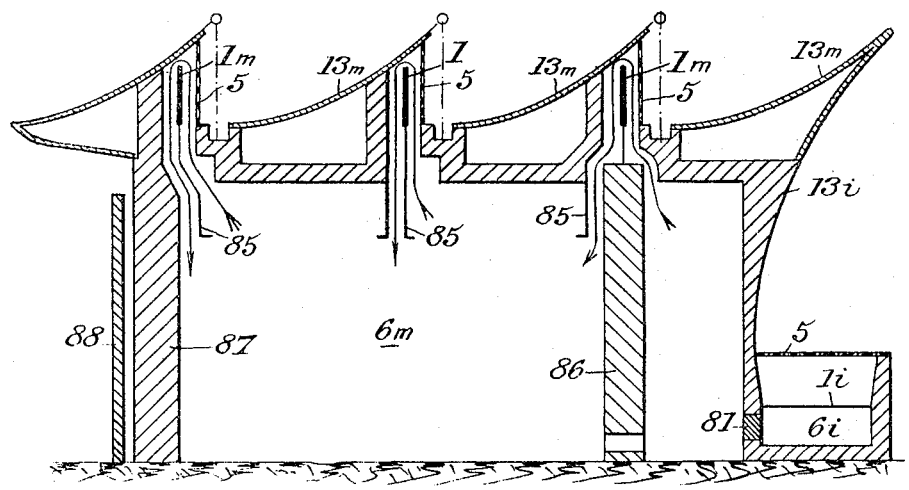
FIG. 19 is a longitudinal section of a device according to the invention applied to the air conditioning of a building.

Such devices can also be placed contiguous to each other as shown by FIG. 19 to constitute for example the roof of a building, the cold chamber $6_m$ being then constituted by one or several rooms inside said building.

FIG. 19 shows a building using cold producing devices according to the invention on both its north face and its roof, its north face being provided with cold producing devices according to the embodiment shown by FIG. 14 and its roof being provided with devices according to the embodiment shown by FIG. 18.

Cooling by the devices located in the roof is very advantageous; the cooled air produced by contact with the radiating body $1_m$ goes down into the dwelling rooms through circulation chimneys 85 and cools the interior walls 86 and the exterior walls 87 of the building, said walls having an important thermic mass enabling them to act as accumulators of thermal energy.

In the case of FIG. 19 the building is further provided with a cold producing device at the level of the ground for use either in a cold storage chamber to cooperate with the cooling systems located in the roof for air-conditioning purposes.

In the case of buildings having several stories, cooling through their north wall further permits of providing cooling devices at the level of every story and of the ground, in particular in the case where said north walls are provided with cooling systems made according to the embodiment shown by FIG. 16.

The external faces of the external walls 87 of the building, preferably, reflect the infra-red rays and cooperate with walls 88 characterized by a low themic mass and a high insulating capacity which permit the selective collection of cold air during nighttime and the stabilization of this cold air by gravity during daytime.

In the case where the cold producing devices are to be used in connection with cold chambers or storage spaces, the protection screen 5 may be made of a material transparent for the radiations of the windows of the atmosphere and absorbant for the radiations in the wavelength bands for which the atmosphere is itself absorbant. Such a screen is then likely to act as an inversed glass-house.

If the air surrounding the radiating body in such devices is replaced by carbon dioxide, which is responsible more particularly for the absorption ability of the atmosphere for the wavelength bands ranging from about 13 to about 16 microns, the temperature in the vicinity of the radiating body can become lower by a few degrees, approximately 3 to 5 degrees, than in the case of the same chamber being filled with air. The carbon dioxide between the radiating body and the polyethylene screen 5 acts itself as the above screen transparent for the radiations of the windows of the atmosphere and absorbant for wavelengths bands for which the temperature is absorbant, thereby ensuring said inversed glass-house effect.

While the invention is described in connection with particular preferred embodiments, it will be understood that it is not limited to these embodiments but it is intended to encompass all alternatives, modifications and equivalents, such as devices in which the concave surfaces $13i$ of the exterior walls 80 of said devices (FIG. 14) have the shape of a cylinder the directrix of which is an ellipse having a substantially elongated form so that its focus is at a sufficient distance of said concave surfaces, as well as other modifications which may be properly included within the spirit and scope of the invention as defined by the appended claims.

What I claim is:

1. A cold producing device which comprises, in combination,
    an infra-red rays radiating body capable of giving off rays within the wavelength bands for which the atmosphere is transparent thereto,
    an opaque envelope surrounding said radiating body for thermally insulating it from the earth and for preventing the radiations from the sun and from earth objects from directly reaching said radiating body,
    a reflecting lining carried by said envelope, said lining being so shaped and dimensioned as to reflect the radiations emitted by said body into the atmosphere within a substantial solid angle,
    a screen of a material transparent to radiations of the wavelengths for which the atmosphere is transparent, out of contact with said radiating body and forming a partition between it and the atmosphere, said screen forming, with said envelope, a chamber in which said radiating body is located, and
    means, on the outside of said chamber, forming a curved wall connected to said envelope and extending upwardly of said chamber, said wall having a convex face adapted to prevent sun rays and rays from the earth from directly reaching said radiating body, the opposed, concave, face of said wall being reflective and adapted to reflect the rays striking it from said radiating body into directions above the horizon.

2. A cold producing device according to claim 1 wherein the reflective face of said wall comprises a concave, cylindrical surface the directrix of which is a parabola.

3. A cold producing device according to claim 2 wherein the cylindrical surface is positioned in such a manner that the whole of said radiating body is contained within the space between said surface and the focal zone thereof.

4. A cold producing device according to claim 1 wherein the reflective face of said wall is a concave cylindrical surface the generatrix of which is an ellipse.

5. A cold producing device according to claim 2 wherein said radiating body is of substantially flat vertical shape, said screen being vertical and parallel to said radiating body on one side thereof, the reflective concave face of said curved wall being turned upwardly.

6. A cold producing device according to claim 5 wherein the focus of said parabola is located at a short distance above the top edge of said curved wall, the axis of said parabola being vertical and disposed at a small distance from said screen, the apex of which parabola is approximately at the level of the lower part of the radiating body.

7. A cold producing device according to claim 6, the portion of parabola that is used extending between one side of said chamber and a horizontal plane passing through the top part of said chamber.

8. A cold producing device which comprises, in combination, an infra-red radiating body capable of giving off rays within the wavelength bands for which the atmosphere is transparent thereto, said body including at least one horizontal flat portion,
an opaque envelope surrounding said radiating body for thermally insulating it from the earth and for preventing the radiations from the sun and from earth objects from reaching said radiating body, the inner section of said envelope being rectangular,
a reflecting lining carried by the inner face of said envelope,
a screen of a material transparent to radiations of the wavelengths for which the atmosphere is transparent, out of contact with said radiating body and forming a partition between it and the atmosphere, said screen forming, with said envelope, a chamber in which said radiating body is located, and
means, on the outside of said chamber, forming a curved wall having a convex face adapted to prevent sun rays and rays from the earth from directly reaching said radiating body, the opposed, concave, face of said wall being reflective and adapted to reflect the rays striking it from said radiating body into directions above the horizon, said reflective concave face being cylindrical, with a parobolic directrix.

9. A cold producing device according to claim 8 wherein the focus of said parabolic directrix is located on the outside of said chamber substantially above a top edge of said chamber.

10. A cold producing device according to claim 9 wherein said parabolic directrix is located between a top edge of said chamber and a vertical plane passing through another top edge of said chamber.

11. A cold producing device according to claim 8 further comprising vertical screens for eliminating direct sun rays at sunrise or at sunset.

12. A cold producing device according to claim 8 wherein said radiating body comprises at least two flat steps at different respective levels.

13. A cold producing device which comprises in combination,
a radiating body capable of giving off rays within the wavelength bands for which the atmosphere is transparent,
an opaque envelope surrounding said radiating body for thermally insulating it from the earth, said envelope including an opening positioned to prevent direct radiations from the sun and from the earth from reaching said body,
a reflecting lining carried by the internal face of said envelope, said lining being substantially out of contact with said body and diverging outwardly toward said opening to enable said radiating body to radiate within a solid angle of over $2\pi$ steradians and to prevent substantially all of the rays emitted by said radiating body to fall back thereon and reflect them into the atmosphere through said opening, and
a screen of a material transparent to radiations of the wavelengths for which the atmosphere is transparent, out of contact with said body, closing said opening to isolate said body from the atmosphere.

14. A cold producing device according to claim 13 wherein said lining is shaped in the form of a frustum of a cone.

15. A cold producing device according to claim 13 wherein said lining is shaped in the form of a frustum of a pyramid.

16. A cold producing device according to claim 13 wherein said lining has an involute shaped cross section.

17. A cold producing device according to claim 13 wherein said lining has a cylindro-parabolic cross section.

18. A cold producing device according to claim 13 wherein said lining has an elliptical cross section.

19. A cold producing device according to claim 13 wherein said opaque envelope comprises an external reflecting coating for the radiations diffused by the atmosphere and produced by the earth.

20. A cold producing device according to claim 19 wherein said external reflecting coating is a paint consisting chiefly of titanium oxide.

21. A cold producing device according to claim 13 wherein said envelope is filled with carbon dioxide.

22. A device according to claim 13 wherein said screen comprises at least one sheet of polyethylene.

23. A device according to claim 13 wherein said internal lining is reflective of infra-red rays and said envelope is reflective of sun rays.

24. A cold producing device which comprises in combination,
a radiating body capable of giving off rays within the wavelength bands for which the atmosphere is transparent,
an opaque envelope surrounding said radiating body for thermally insulating it from the earth, said envelope including an opening positioned to prevent direct radiations from the sun and from the earth from reaching said body,
a reflecting lining carried by the internal face of said envelope, said lining diverging outwardly toward said opening to reflect the radiations emitted by said body into the atmosphere, and
a screen of a material transparent to radiations of the wavelengths for which the atmosphere is transparent, out of contact with said body, closing said opening to isolate said body from the atmosphere, said envelope being filled with carbon dioxide.

25. A cold producing device comprising a plurality of cold producing units each unit comprising in combination,
an infra-red rays radiating body capable of giving off rays within the wavelength bands for which the atmosphere is transparent thereto,
an opaque envelope surrounding said radiating body for thermally insulating it from the earth, said envelope including an opening positioned to prevent direct radiations from the sun and from the earth from reaching said radiating body,
a reflecting lining carried by the internal face of said envelope, said lining diverging outwardly toward said opening to reflect the radiations emitted by said body into the atmosphere within a maximum solid angle, and
a screen of a material transparent to radiations of the wavelengths for which the atmosphere is transparent, out of contact with said radiating body and forming a partition between it and the atmosphere, said screen forming with said envelope a closed chamber in which said radiating body is located,
said units being of decreasing dimensions respectively so that each of said devices other than the largest one are respectively wholly contained within the chamber of the next larger one of said units, each of said units being substantially out of contact with the next larger unit.

26. A cold producing device according to claim 25 wherein each radiating body of each of said units other than the smaller one is located around the envelope of the immediately smaller one of said devices and slightly above the screen thereof.

27. A cold producing device according to claim 25 wherein the radiating body of each of said units is located at the bottom of the heat insulating envelope of said device.

References Cited by the Examiner
UNITED STATES PATENTS

| | | | |
|---|---|---|---|
| 1,457,565 | 6/1923 | Warrick | 126—271 X |
| 2,234,122 | 3/1941 | Heck | 62—467 |
| 2,644,736 | 7/1953 | Atchison | 62—249 X |
| 3,043,112 | 7/1962 | Head | 62—467 |

FOREIGN PATENTS

| | | |
|---|---|---|
| 853,678 | 12/1939 | France. |
| 472,427 | 6/1952 | Italy. |

ROBERT A. O'LEARY, *Primary Examiner.*

M. A. ANTONAKAS, *Assistant Examiner.*